United States Patent [19]
Morikawa

[11] Patent Number: 5,967,125
[45] Date of Patent: Oct. 19, 1999

[54] AIR/FUEL RATIO CONTROL DEVICE FOR INTERNAL COMBUSTION ENGINE

[75] Inventor: Junya Morikawa, Toyota, Japan

[73] Assignee: Denso Corporation, Kariya, Japan

[21] Appl. No.: 09/076,914

[22] Filed: May 13, 1998

[30] Foreign Application Priority Data

May 20, 1997 [JP] Japan .................................. 9-129587

[51] Int. Cl.$^6$ .................................................. F02M 33/04
[52] U.S. Cl. ....................................... 123/520; 123/90.15
[58] Field of Search ............................... 123/520, 90.15, 123/90.16, 90.17

[56] References Cited

U.S. PATENT DOCUMENTS

| | | | |
|---|---|---|---|
| 5,215,061 | 6/1993 | Ogawa et al. | 123/520 |
| 5,520,160 | 5/1996 | Aota et al. | 123/675 |
| 5,758,308 | 5/1998 | Maki et al. | 701/104 |
| 5,806,501 | 9/1998 | Osanai | 123/520 |
| 5,850,820 | 12/1998 | Tsutsumi et al. | 123/520 |
| 5,884,609 | 5/1999 | Kawamoto et al. | 123/520 |

FOREIGN PATENT DOCUMENTS

| | | |
|---|---|---|
| 5-156973 | 6/1993 | Japan . |
| 7-27020 | 1/1995 | Japan . |
| 7-83096 | 3/1995 | Japan . |

*Primary Examiner*—Thomas N. Moulis
*Attorney, Agent, or Firm*—Nixon & Vanderhye P.C.

[57] ABSTRACT

A control method and system that achieves a desired purge flow rate in accordance with operation of a variable valve timing control mechanism. Although pumping loss of an internal combustion engine is varied by a change in the amount of operating the variable valve timing control mechanism, a change in an intake pressure in an intake passage is caused by influence of inertia supercharging, and the purge flow rate is changed. In this case, an opening degree of a purge solenoid valve is set according to the respective amount of operating the variable valve timing control mechanism. The set opening degree is considered by the ECU, and a final opening degree of the purge solenoid valve is set, so that a desired purge flow rate can be controlled regardless of the operation of the variable valve timing control mechanism.

18 Claims, 10 Drawing Sheets

FIG. 5

| FULLY OPEN PURGE RATE PGRMX (%) (AC=60°CA) |
| FULLY OPEN PURGE RATE PGRMX (%) (AC=40°CA) |
| FULLY OPEN PURGE RATE PGRMX (%) (AC=20°CA) |
| FULLY OPEN PURGE RATE PGRMX (%) (AC=0°CA) |

| NE (rpm) \ GN (g/rev) | 0.20 | 0.40 | 0.60 | 0.80 | 1.00 | 1.20 | 1.40 |
|---|---|---|---|---|---|---|---|
| 800  | 20.1 | 14.5 | 11.2 | 8.6 | 6.2 | 4.6 | 0.0 |
| 1200 | 12.5 | 9.3  | 7.2  | 5.5 | 4.0 | 2.9 | 0.0 |
| 1600 | 9.3  | 6.8  | 5.3  | 4.0 | 2.9 | 2.1 | 0.0 |
| 2000 | 7.9  | 5.7  | 4.4  | 3.3 | 2.4 | 1.8 | 0.0 |
| 2400 | 6.0  | 4.5  | 3.5  | 2.6 | 1.9 | 1.4 | 0.0 |
| 2800 | 5.5  | 4.1  | 3.1  | 2.3 | 1.7 | 1.2 | 0.0 |
| 3200 | 4.9  | 3.6  | 2.7  | 2.0 | 1.5 | 1.1 | 0.0 |
| 3600 | 4.1  | 3.0  | 2.2  | 1.7 | 1.3 | 0.9 | 0.0 |
| 4000 | 3.4  | 2.4  | 1.8  | 1.4 | 1.1 | 0.8 | 0.0 |

FIG. 6

IDLE
TARGET TAU CORRECTION AMOUNT KTPRG = -30%

NON-IDLE

| ENGINE (rpm) | 500 | 1000 | 1500 | 2000 | 2500 | 3000 | 3500 | 4000 |
|---|---|---|---|---|---|---|---|---|
| TARGET TAU CORRECTION AMOUNT KTPRG (%) | -30 | -30 | -35 | -40 | -40 | -45 | -45 | -50 |

FIG. 7

CALCULATING FULLY OPEN PURGE RATE LOAD

| MEASURING LOAD AC (°CA) | ... | ... | ... | ... | ... | ... | ... |
|---|---|---|---|---|---|---|---|
| 0 | | | | | | | |
| 20 | | | | | | | |
| 40 | | | | | | | |
| 60 | | | | | | | |

FIG. 8

FULLY OPEN PURGE RATE PGRMX (%)

| NE (rpm) \ LOAD | ... | ... | ... | ... | ... | ... | ... |
|---|---|---|---|---|---|---|---|
| 800 | 20.1 | 14.5 | 11.2 | 8.6 | 6.2 | 4.6 | 0.0 |
| 1200 | 12.5 | 9.3 | 7.2 | 5.5 | 4.0 | 2.9 | 0.0 |
| 1600 | 9.3 | 6.8 | 5.3 | 4.0 | 2.9 | 2.1 | 0.0 |
| 2000 | 7.9 | 5.7 | 4.4 | 3.3 | 2.4 | 1.8 | 0.0 |
| 2400 | 6.0 | 4.5 | 3.5 | 2.6 | 1.9 | 1.4 | 0.0 |
| 2800 | 5.5 | 4.1 | 3.1 | 2.3 | 1.7 | 1.2 | 0.0 |
| 3200 | 4.9 | 3.6 | 2.7 | 2.0 | 1.5 | 1.1 | 0.0 |
| 3600 | 4.1 | 3.0 | 2.2 | 1.7 | 1.3 | 0.9 | 0.0 |
| 4000 | 3.4 | 2.4 | 1.8 | 1.4 | 1.1 | 0.8 | 0.0 |

AIR/FUEL RATIO CONTROL DEVICE FOR INTERNAL COMBUSTION ENGINE

CROSS-REFERENCE TO RELATED APPLICATIONS

This application is related to and claims priority from Japanese Patent Application No. Hei 9-129587 filed on May 20, 1997, the contents of which are incorporated herein by reference.

BACKGROUND OF THE INVENTION

1. Field of the Invention

The present invention relates to an air/fuel ratio control device for an internal combustion engine having, for example, a variable valve timing control mechanism capable of freely changing intake valve timing, and capable of executing purge control.

2. Description of Related Art

A conventional air/fuel ratio control device for an internal combustion engine is disclosed in Japanese Patent Application Laid-Open No. 7-83096. The application describes a device in which a purge flow rate is controlled with respect to an intake amount. Also, purge fuel concentration is detected based on an air/fuel ratio feedback value (coefficient) during fuel purge, and the fuel injection amount is corrected.

In the meantime, when the above-described technology is applied to an electronic control type fuel injection system referred to as an "L-Jetronic" system, where a fuel injection amount supplied to an internal combustion engine is controlled by using an air flow meter, it is necessary to calculate an opening degree of a purge valve indirectly from an intake amount, an intake charge efficiency or the like to secure a desired purge flow amount. In this case, according to an internal combustion engine La having a variable valve timing control mechanism, when the valve timing is changed, the intake amount or the intake charge efficiency is changed. Accordingly, the desired purge flow amount cannot be accurately controlled. Thus, the air/fuel ratio control performance is deteriorated, thereby reducing vehicle drivability and vehicle emission performance.

SUMMARY OF THE INVENTION

Hence, the present invention has been carried out in order to resolve such a drawback. It is therefore an object of the present invention to provide an air/fuel ratio control device for an internal combustion engine capable of achieving a desired purge amount regardless of a change in valve timing by a variable valve timing control mechanism.

In particular, the present invention provides an air/fuel ratio control device for an internal combustion engine. The device includes physical amount detecting means for detecting a physical amount related to an intake amount supplied to the internal combustion engine. Purge controlling means controls an opening degree of a purge valve when fuel vapor adsorbed to a canister is discharged to an intake side of the internal combustion engine based on the physical amount detected by the physical amount detecting means. A variable valve timing control mechanism installed in a drive force transmission mechanism transmits a drive force from a drive shaft of the internal combustion engine to a driven shaft for opening and closing at least one of an intake valve and an exhaust valve. The variable valve timing control mechanism is also capable of rotating either one of the drive shaft and the driven shaft through a predetermined angle range. In addition, purge correcting means corrects the opening degree of the purge valve by the purge controlling means such that a desired purge flow rate can be provided independent of operation of the variable valve timing control mechanism.

In another embodiment of the present invention, the purge correcting means may be operative to correct either of the opening degree of the purge valve by the purge controlling means and a load used in calculating the opening degree in accordance with a degree of adjustment of the variable valve timing control mechanism.

In yet another embodiment of the present invention, fuel concentration detecting means is provided for directly or indirectly detecting a fuel concentration purged by the purge controlling means. Also, fuel amount correcting means is provided for correcting a fuel injection amount supplied to the internal combustion engine based on the opening degree of the purge valve by the purge controlling means and the fuel concentration detected by the fuel concentration detecting means. Purge correcting means then corrects either of the opening degree of the purge valve by the purge controlling means and a load used in calculating the opening degree in accordance with a degree of adjustment of the variable valve timing control mechanism.

BRIEF DESCRIPTION OF THE DRAWINGS

FIG. 5 illustrates maps for setting a fully open purge rate in FIG. 4 in accordance with a relative rotational angle of a variable valve timing control mechanism, with an engine rotational number and an intake amount as parameters;

FIG. 6 illustrates a map for setting a target TAU (fuel injection amount) correction amount in FIG. 4;

FIG. 7 illustrates a map for setting a load for calculating the fully open purge rate in FIG. 4 in accordance with a measured load and the relative rotational angle of the variable valve timing control mechanism;

FIG. 8 illustrates a map for setting the fully open purge rate from the load set in FIG. 7 and the engine rotational number;

DETAILED DESCRIPTION OF PREFERRED EMBODIMENTS

An explanation has been given of embodiments of the present invention based on examples as follows.

Figure 1:
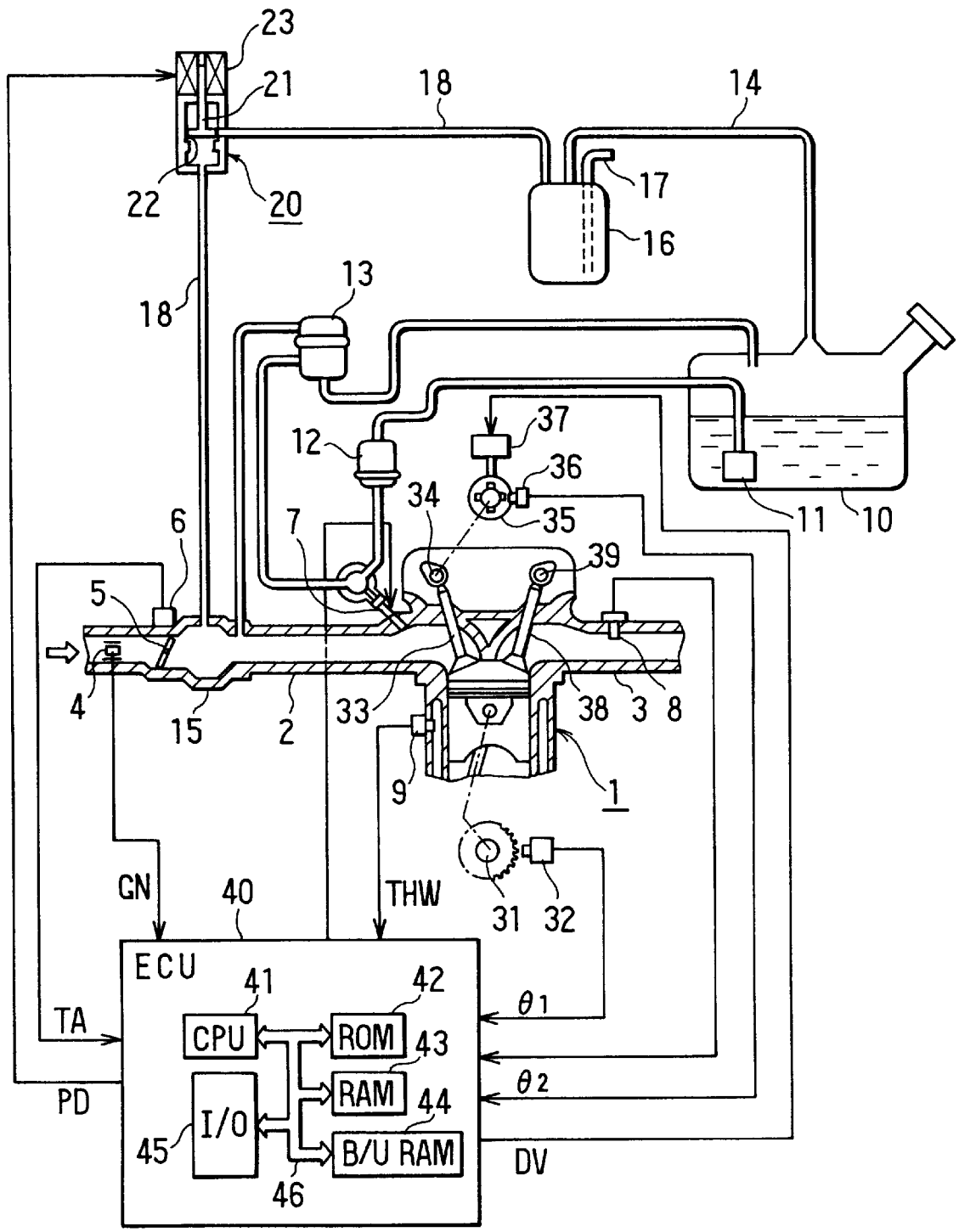
FIG. 1 is a schematic diagram showing an air/fuel ratio control device for an internal combustion engine according to an embodiment of the present invention.

FIG. 1 shows an air/fuel ratio control device for an internal combustion engine according to the present invention.

In FIG. 1, an intake passage 2 and an exhaust passage 3 are connected to an internal combustion engine (engine) 1 comprising a plurality of cylinders. The intake passage 2 is arranged with an air flow meter 4 for detecting an intake amount introduced from an air cleaner, not illustrated, on the upstream side, a throttle valve 5, a throttle opening degree sensor 6 for detecting an opening degree of the throttle valve 5, and an electromagnetic type injector (fuel injection valve) 7. Further, the exhaust passage 3 is arranged with an oxygen ($O_2$) sensor 8 for detecting an air/fuel ratio. The oxygen sensor 8 outputs a voltage signal in accordance with an oxygen concentration in exhaust gas. Further, a water temperature sensor 9 is arranged for detecting the temperature of cooling water of the internal combustion engine 1.

Further, a fuel supply system for supplying fuel to the injector 7 includes a fuel tank 10, a fuel pump 11, a fuel filter 12 and a pressure regulator 13. Further, fuel in the fuel tank 10 is pressurized to the respective injector 7 by the fuel pump 11 via the fuel filter 12. Fuel supplied to the respective injector 7 is adjusted at a predetermined pressure by the pressure regulator 13.

A purge passage 14 extended from the upper portion of the fuel tank 10 communicates with a surge tank 15 at the intake passage 2. A canister 16 storing activated carbon as an adsorbing material for adsorbing evaporated fuel generated at inside of the fuel tank 10, is connected about midway on the purge passage 14. Further, the canister includes an atmosphere opening hole 17 for introducing outside air. A portion of the purge passage 14, on the side of the surge tank 15 from the canister 16, includes a discharge passage 18. Also, a purge solenoid valve 20, which functions as a flow rate valve, is located near the middle of the discharge passage 18. According to the purge solenoid valve 20, a valve element 21 is always urged in a direction of closing a seat portion 22 by a spring (not illustrated). Also, the valve element 21 opens the seat portion 22 by magnetizing a coil 23. Accordingly, the discharge passage 18 is closed by demagnetizing the coil 23 of the purge solenoid valve 20, and the discharge passage 18 is opened by magnetizing the coil 23. The opening degree of the purge solenoid valve 20 is adjusted by a duty ratio control based on pulse width modulation that is carried out by an ECU (Electronic Control Unit) 40, which is described later in more detail.

Figure 2:
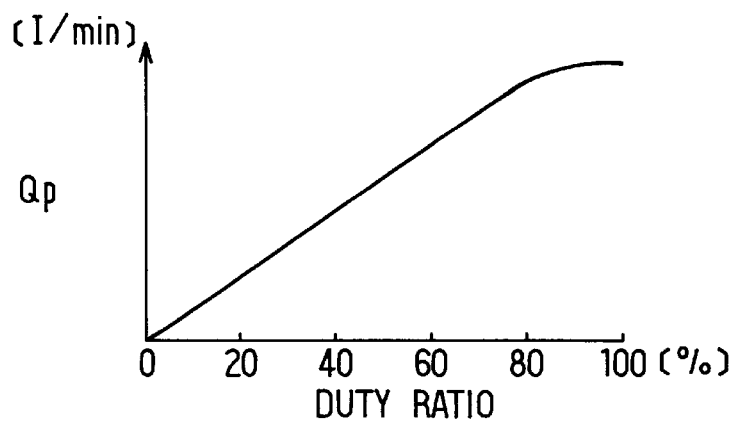
FIG. 2 is a characteristic diagram showing the relationship between a duty ratio and a purge air amount used in the air/fuel ratio control device for an internal combustion engine according to the present invention.

Accordingly, when a control signal is supplied from an ECU 40 to the purge solenoid valve 20, and the canister 16 communicates with the intake passage 2 of the internal combustion engine 1, new air Qa is introduced from the atmosphere and transmitted into the cylinder of the internal combustion engine 1 from the intake passage 2. After changing air in the canister 16, the canister purge is carried out, and recovery of the canister adsorbing function is achieved. Further, an amount Qp (1/min) of purge air, which is new air introduced via the purge solenoid valve 20 at this occasion, is adjusted by changing the duty ratio (%) of a pulse signal supplied from ECU 40 to the purge solenoid valve 20. FIG. 2 is a characteristic diagram showing the purge air amount Qp (1/min) with respect to the duty ratio (%) in this case, showing a relationship between the duty ratio (%) and the purge air amount Qp (1/min) of the purge solenoid valve 20 when negative pressure on the inside of the intake passage 2 remains constant. As shown by FIG. 2, it is known that, according to the purge solenoid valve 20, a purge air amount, that is, an air amount sucked into the internal combustion engine 1 via the canister 16, is increased substantially linearly by an increase in the duty ratio from 0%.

Further, a well-known variable valve timing control mechanism 35 is connected to a cam shaft 34 of an intake valve of the internal combustion engine 1. Further, the variable valve timing control mechanism 35 is driven via a spool valve 37. The spool valve is a flow rate control valve with lubricant oil of the internal combustion engine 1 as working fluid, based on a crank angle signal $\theta 1$ from a crank angle sensor 32 arranged at a crank shaft 31 of the internal combustion engine 1 and a cam angle signal $\theta 2$ from a cam angle sensor 36 arranged at the cam shaft 34, by which a relative rotational angle of the cam shaft 34 in correspondence with a rotational angle of the crank shaft 31 of the internal combustion engine 1 is changed.

Incidentally, according to the embodiment, the variable valve timing control mechanism is not connected to a cam shaft 39 of an exhaust valve 38 of the internal combustion engine 1.

Further, various sensor signals of an intake amount signal GN from the air flow meter 4, a throttle opening degree signal TA from the throttle opening degree sensor 6, a cooling water temperature signal THW from the water temperature sensor 9, the crank angle signal $\theta 1$ from the crank angle sensor 32, the cam angle signal $\theta 2$ from the cam angle sensor 36 and other control signals are inputted to an ECU 40. The ECU 40 is a logical calculation circuit centering on a CPU 41, which is a conventional central processing unit, a ROM 42 that stores control programs and control maps, a RAM 43 that stores various data, a B/U (backup) RAM 44, as well as additional conventional components. The CPU is connected to an input and output circuit 45 for inputting detection signals from various sensors and outputting control signals to various actuators via a bus 46.

An engine rotational number, or value, NE is calculated by the ECU 40 based on the crank angle signal $\theta 1$ from the crank angle sensor 32. Also, an output signal (voltage signal) from the oxygen sensor 8 is inputted to the ECU 40, and a rich or lean mixture determination is carried out. Further, at a reversal interval from rich to lean or lean to rich, in order to increase or decrease the fuel injection amount, the ECU 40 changes (skips) an FAF value which is an air fuel ratio feedback correction coefficient described in more detail later, in a stepwise manner. The ECU thus gradually increases or decreases the FAF value when the mixture is rich or lean.

In the air/fuel ratio control device for an internal combustion engine according to the present invention, various programs of air/fuel ratio F/B (feedback) control, purge rate control, purge rate gradual change control, evaporative emission (evaporated fuel) concentration detection, fuel injection amount control, purge solenoid valve control and valve timing control are carried out.

An explanation will be given of the operation of embodiments with regard to each control operation.

Air/Fuel Ratio F/B Control

Figure 3:
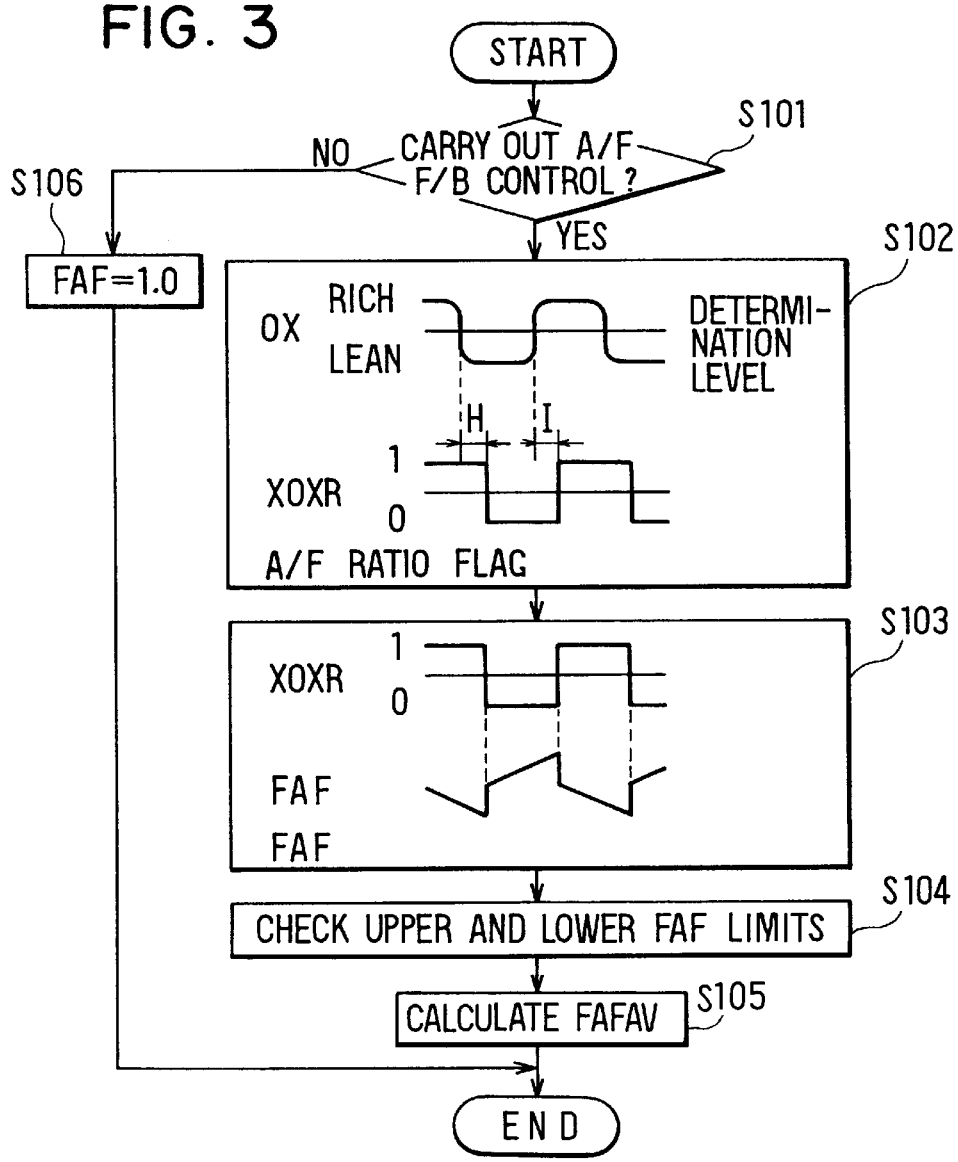
FIG. 3 is a flow diagram showing a processing procedure of an air/fuel ratio feedback control in CPU of ECU used in the air/fuel ratio control device for an internal combustion engine according to the present invention.

Referring to FIG. 3, an explanation will be given of an air/fuel ratio F/B control routine. Incidentally, the air/fuel ratio F/B control routine is executed in the CPU 41 about every 4 ms.

In FIG. 3, first, at step S101, it is determined whether the air/fuel ratio F/B control can be carried out. All of the following main conditions must be satisfied as conditions for carrying out the air/fuel ratio F/B control: (1) Engine is not starting; (2) Fuel is not cut; (3) Cooling water temperature THW is a predetermined temperature or higher; (4) Fuel injection amount TAU exceeds a predetermined lower limit value TAUmin; (5) Oxygen sensor is in an activated state;

When these conditions are established, the routine proceeds to step S102, where an output from the oxygen sensor 6 is compared with a predetermined determination level OX, and an air/fuel ratio flag XOXR is operated with delay times H and I (ms), respectively. For example, a mixture is rich when XOXR=1 and a mixture is lean when XOXR=0. Next, the operation proceeds to step S103, where the FAF value that is an air/fuel ratio feedback correction coefficient is operated based on the air/fuel ratio flag XOXR. That is, immediately after the air/fuel ratio flag XOXR is changed from "0" to "1" or from "1" to "0", the FAF value is skipped by a predetermined value and a calculation of integrating the FAF value is executed during a time period where the air/fuel ratio flag XOXR continues to be "1" or "0". Next, the operation proceeds to step S104 where upper and lower limits of the FAF value are checked. Thereafter, the operation proceeds to step S105 where dulling (smoothing) processing is carried out at every skip or at every predetermined time period based on the determined FAF value. An FAFAV value, which is an average value of the FAF value is then calculated, and the routine is finished.

Meanwhile, when the air/fuel ratio F/B control cannot be carried out at step S101, the operation proceeds to step S106, where the FAF value is set to an initial value of 1.0 and the routine is finished. In this case, the FAF value that is the air/fuel ratio feedback correction coefficient is an index indicating how the air/fuel ratio is deviated from a theoretical air/fuel ratio.

Purge Rate Control

An explanation will be given of a purge rate control routine based on FIG. 4, and also with reference to FIG. 5 and FIG. 6. Incidentally, the purge rate control routine is carried out in the CPU 41. FIG. 5 shows a plurality of maps for setting a fully open purge rate PGRMX (%) with an engine rotational number NE (rpm) and an intake amount GN (g/rev) (although in this embodiment, load is constituted by intake amount; otherwise, it may be charge efficiency or estimated intake pressure) as parameters. The fully open purge rate PGRMX is set in correspondence with a relative rotational angle AC (°CA (crank angle)), mentioned later, of the variable valve timing control mechanism 35. The plurality of maps is programmed into the ROM, and indicates a ratio of an air amount flowing through the discharge passage 18 when the duty ratio of the purge solenoid valve 20 is 100%, as compared with a total air amount flowing into the internal combustion engine 1 via the intake passage 2. Further, FIG. 6 is a map for setting a target TAU correction amount KTPRG (%).

Figure 4:
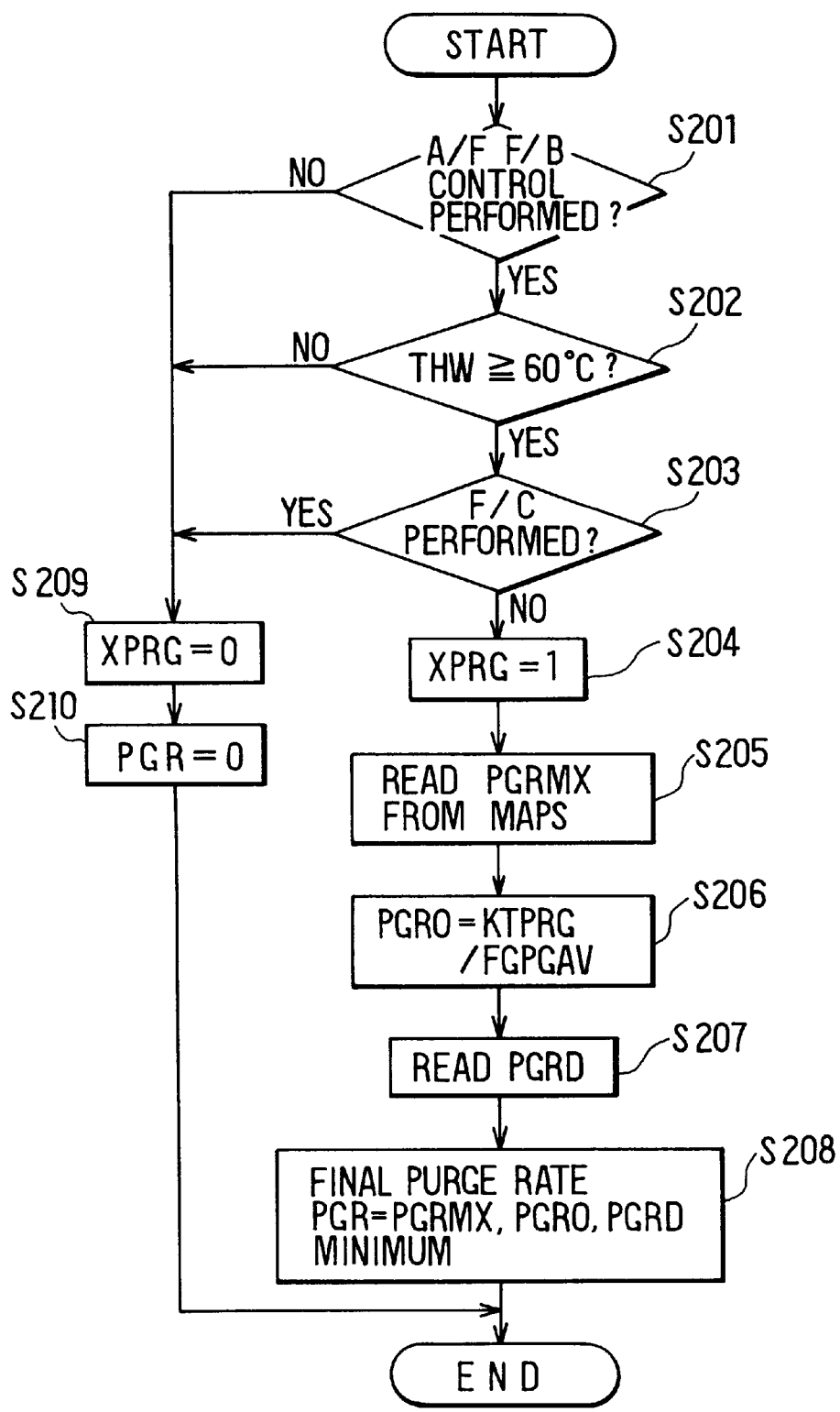
FIG. 4 is a flow diagram showing a processing procedure of a purge rate control in CPU of ECU used in the air/fuel ratio control device for an internal combustion engine according to the present invention.

In FIG. 4, it is first determined whether air/fuel ratio F/B (feedback) control operation is being carried at step S201. Next, at step S202, it is determined whether the cooling water temperature THW is at 60° C. or higher. At step S203, it is determined whether F/C (fuel cut) is being carried out. Incidentally, the criterion at step S201 is for excluding states of engine start control and the like, the criterion at step S202 is for excluding a state where an amount of fuel other than that from purging operation is being corrected to increase based on correction by water temperature, and the criterion at step S203 is for preventing the purging operation during a time period of F/C (fuel cut). When the criteria at step S201 and step S202 are established, and the criterion at step S203 is not established, the operation proceeds to step S204, where a purge executing flag XPRG is set to 1.

Next, the operation proceeds to step S205, where the fully open purge rate PGRMX (%) is read from the maps of FIG. 5, with the intake amount GN and the engine rotational number NE as parameters, and in correspondence with the relative rotational angle AC of the variable valve timing control mechanism 35 at this occasion. Incidentally, intermediate values in maps, and numerical values among maps, are respectively calculated by interpolation. Next, the operation proceeds to step S206, where the target purge rate PGRO is calculated from the target TAU correction amount KTPRG and an evaporative emission concentration average value FGPGAV. Here, the target TAU correction amount KTPRG indicates how much the fuel injection amount can be corrected to decrease at maximum when fuel gas is replenished by carrying out the purging operation. The target TAU correction amount KTPRG is pre-set based on an allowance degree with respect to a minimum injection pulse of the injector 7. The value is −30 (%) during idling of the internal combustion engine 1. The value is formed into a map as shown by FIG. 6, with the engine rotational number NE as a parameter when the engine is not idled, and the value is stored in ROM 42. Incidentally, the maps are typically set where the target TAU correction amount KTPRG is reduced under an operating state where the basic fuel injection amount TP is small.

Further, the evaporative emission concentration average value FGPGAV corresponds to an amount of fuel adsorbed in the canister 16, is estimated, is stored inside the RAM 43, and is periodically updated. The target purge rate PGRO corresponds to how much fuel gas must be replenished by the purging operation when it is assumed that the fuel injection amount is reduced fully to the target TAU correction amount KTPRG. Under the same operating state, the larger the evaporative emission concentration average value FGPGAV is, the smaller the value of the target purge rate PGRO becomes. Also, the smaller the evaporative emission concentration average value FGPGAV is, the larger the target purge rate PGRO is.

After calculating the target purge rate PGRO as described above, the routine proceeds to step S207, where the purge rate gradual change value PGRD is read. The purge rate gradual change value PGRD is a control value that is used to avoid a situation where, when the purge rate is abruptly changed by a large amount, the correcting operation cannot catch up with the large change, and an optimum air/fuel ratio cannot be maintained. A detailed explanation will later be given of how the purge rate gradual change value PGRD is set in the purge rate gradual change control.

Next, the routine proceeds to step S208, where a minimum value among the fully open purge rate PGRMX at step S205, the target purge rate PGRO at step S208 and the purge rate gradual change value PGRD at step S207 is determined as a final purge rate PGR for carrying out the purge control. After this, the routine then ends. Meanwhile, when the criterion at step S201 or step S202 is not established, or the criterion at step S203 is established, the routine proceeds to step S209 where the purge executing flag XPRG is set to 0. Next, the operation proceeds to step S210, where the final purge rate PGR is set to 0 and the main routine is finished. Here, the fact that the final purge rate PGR is 0, signifies that the purge control is not carried out.

In this case, the fully open purge rate PGRMX (%) set at step S205 of the purge rate control routine may be set as follows. That is, based on the intake amount GN (g/rev) as a current measured load and the current relative rotational angle AC (°CA) of the variable valve timing control mechanism 35, a load (g/rev) is calculated for calculating a fully open purge rate. This fully open purge rate has been previously corrected from a map shown by FIG. 7 and is based on the calculated load (g/rev) and the current engine rotational number NE (rpm), the fully open purge rate PGRMX (%) is set from a map shown by FIG. 8. Incidentally, intermediate values of the maps are calculated by interpolation. In this case, the plurality of fully open purge rate maps as shown in FIG. 5 are not necessary since the load is previously corrected.

Purge Rate Gradual Change Control

An explanation will be given of a purge rate gradual change control routine, with reference to FIG. 9. Incidentally, the purge rate gradual change control routine is carried out in the CPU 41 about every 4 ms.

Figure 9:
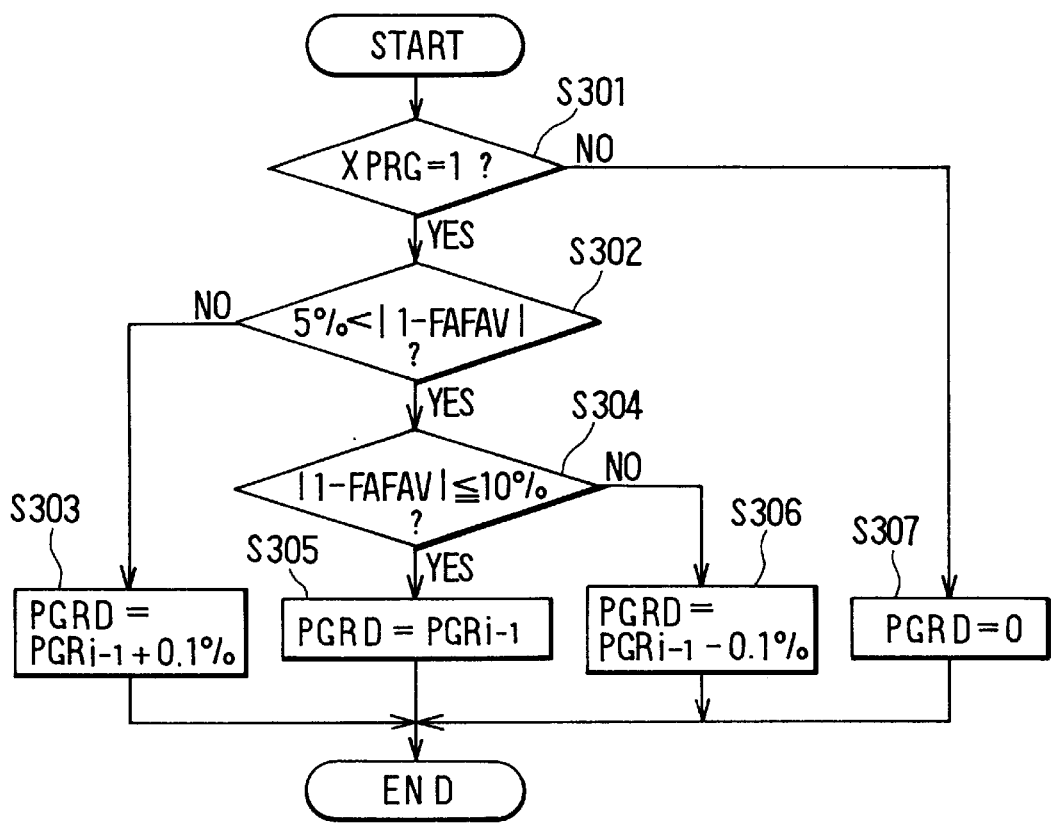
FIG. 9 is a flow diagram showing a processing procedure of a purge rate gradual change control in CPU of ECU used in the air/fuel ratio control device of the present invention.

In FIG. 9, first, it is determined at step S301 whether the purge executing flag XPRG is 1. When the criterion at step S301 is established, the operation proceeds to step S302 where an absolute value of a deviation __1-FAFAV__ as a deviation amount of the air/fuel ratio feedback correction coefficient FAF exceeds 5% is determined. When the criterion at step S302 is not established, the operation proceeds to step S303 where a value produced by adding 0.1% to a final purge rate $PGR_{i-1}$ at a preceding time, constitutes the purge rate gradual change value PGRD. Thereafter, the routine is finished. Meanwhile, when the criterion at step S302 is established, the operation proceeds to step S304, where the absolute value of the deviation __1-FAFAV__ is 10% or lower is determined. When the criterion at step S304 is established, the operation proceeds to step S305, where a value produced by setting the final purge rate $PGR_{i-1}$ at a time prior to the final purge rate $PGR_{i-1}$ constitutes the purge rate gradual change value PGRD. Thereafter, the routine is finished.

Meanwhile, when the criterion at step S304 is not established, the operation proceeds to step S306, where a value produced by subtracting 0.1% from the final purge rate $PGR_{i-1}$ at a preceding time constitutes the purge rate gradual change value PGRD. Thereafter, the routine is finished. Further, when the criterion at step S301 is not established and the purge executing flag XPRG is 0, the operation proceeds to step S307, where the purge rate gradual change value PGRD is set to 0. Thereafter, the routine is finished.

In this way, when the air/fuel ratio feedback correction coefficient FAF is in a state where it is deviated from the theoretical air/fuel ratio (FAF=1) only by 5% or less, the purge rate is further changed. This is so because, even when the purge rate is changed, the correction of the fuel injection amount TAU sufficiently catches up with the change. Further, when the air/fuel ratio feedback correction coefficient FAF starts to deviate from the theoretical air/fuel ratio (FAF=1) by 5% to 10%, the purge rate is maintained as is, since the change in the purge rate and the correction of the fuel injection amount TAU are comparatively balanced. Further, a significant deviation in the air/fuel ratio feedback correction coefficient FAF from the theoretical air/fuel ratio (FAF=1) by more than 10% brings about a state where, as a result of excessively changing the purge rate, the correction of the fuel injection amount TAU cannot catch up with the change.

Therefore, when the state continues as is, the deviation may further be increased. Accordingly, the purge rate is reduced slightly toward the original value.

Evaporative Emission Concentration Detection

An explanation will be given of an evaporative emission concentration detection routine, with reference to FIG. 10. Incidentally, the evaporative emission concentration detection routine is carried out in the CPU 41 about every 4 ms.

Figure 10:
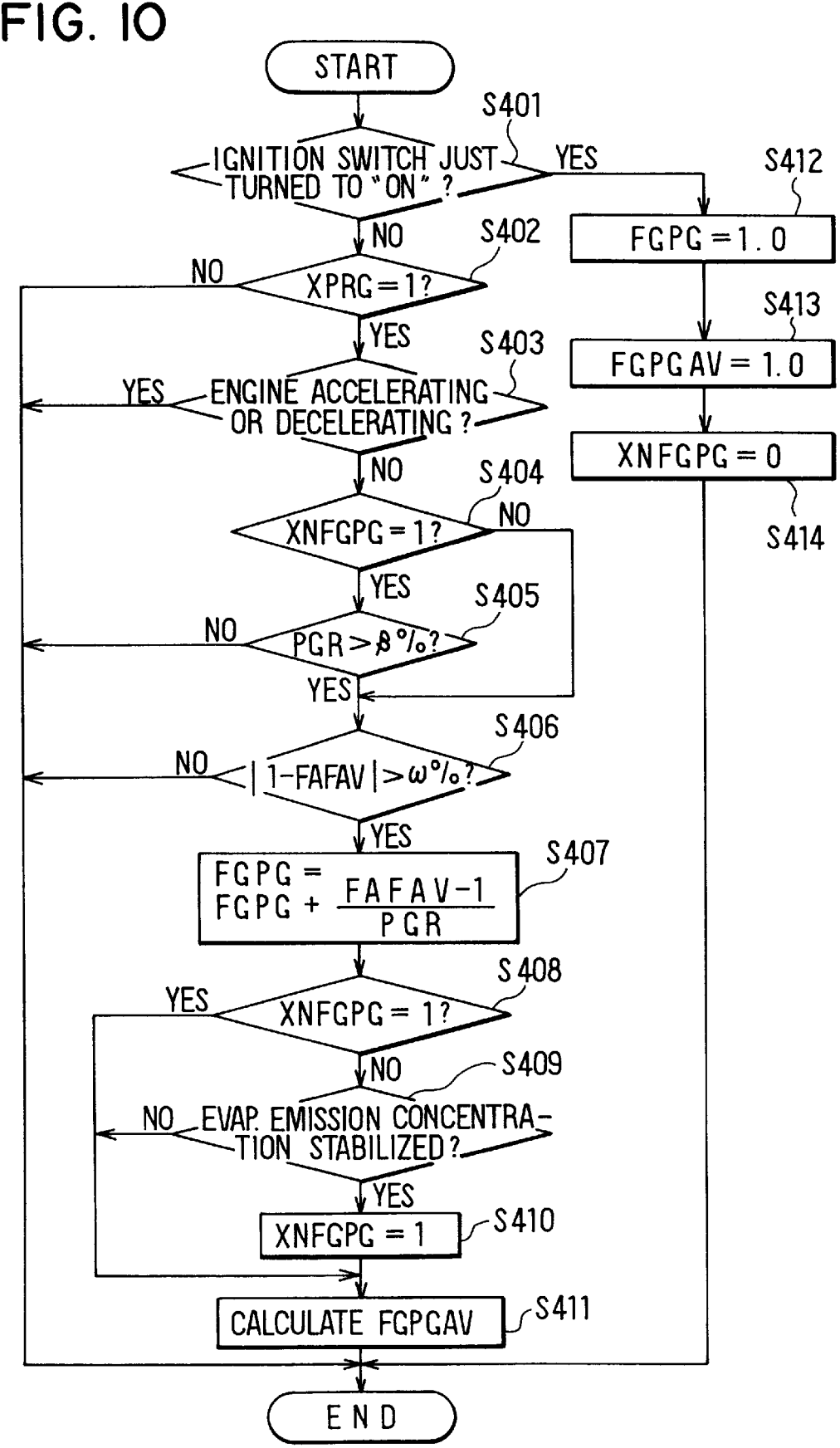
FIG. 10 is a flow diagram showing a processing procedure for detecting the evaporative emission concentration in CPU of ECU used in the air/fuel ratio control device of the present invention.

In FIG. 10, first, it is determined at step 401 whether the engine is under a state immediately after an ignition switch is turned to an ON position. This step is carried out to avoid an error caused by using a value which has been detected at a preceding time, since evaporated fuel is further adsorbed to the canister 16 while the internal combustion engine stops operating. When the criterion at step S401 is not established and the engine is not in the state immediately after the ignition switch is turned ON, the routine proceeds to step S402, where it is determined whether the purge executing flag XPRG is 1, and the purge control operation is started. When the criterion at step S402 is not established, the purge executing flag XPRG is 0, and the purge control is not yet started. The evaporative emission concentration therefore cannot be detected. Accordingly, the routine is finished. Meanwhile, when the criterion at step S402 is established, the operation proceeds to step S403 where it is determined whether the engine is accelerating or decelerating. In this case, the determination of acceleration or deceleration may be carried out by a generally well-known method by detecting the state of an idle switch, a change in the throttle valve opening degree, a change in the intake amount, the vehicle speed or the like. When the criterion at step S403 is established, and the vehicle is accelerating or decelerating, the operating state is transient, and correct evaporative emission concentration cannot be detected. Accordingly, the routine is finished.

Meanwhile, when the criterion at step S403 is not established, the operation proceeds to step S404, where it is determined whether a flag XNFGPG indicating finishing of concentration detection at an initial time has a value of 1. At first occasion, the criterion at step S404 is not established, since the concentration detection has not been finished. Therefore, the operation proceeds to step S406 by skipping step S405, and it is determined whether the absolute value of the deviation between the FAFAV value calculated at step S105 of FIG. 3 and a reference value of 1 exceeds a predetermined value of ω (%). This step is carried out, as the evaporative emission concentration cannot be correctly detected when a clear deviation is not shown in the air/fuel ratio by the purge control operation, and the predetermined value of ω (%) indicates a range of dispersion.

If the criterion at step S406 is not established, the routine is finished. Meanwhile, if the criterion at step S406 is established, the operation proceeds to step S407 where the deviation (FAFAV−1) divided by the final purge rate PGR is added to the evaporative emission concentration FGPG at a preceding time. Accordingly, the value of the evaporative emission concentration FGPG in this embodiment is set to 1 when the evaporative emission concentration in the discharge passage 18 is 0 (air is 100%), and is set to a value smaller than 1 when the evaporative emission concentration in the discharge passage 18 is increased. In this case, at step S407, the evaporative emission concentration may be calculated such that the dull value FAFAV is replaced by the reference value of 1. The more enriched the evaporative emission concentration, the larger the value of the evaporative emission concentration FGPG is set.

Next, the operation proceeds to step S408 where it is determined whether the flag XNFGPG indicating finishing of concentration detection at the initial time is 1. At first, the concentration detection has not been finished. Accordingly, the criterion at step S408 is not established, and the operation proceeds to step S409. At step 409, it is determined whether the evaporative emission concentration is stabilized from the state where a change from a detected value at a preceding time to a detected value at a current time of the evaporative emission concentration FGPG is equal to or smaller than the predetermined value (θ%), and whether this state is continued by three times or more. When the criterion at step S409 is established and the evaporative emission concentration is stabilized, the operation proceeds to step S410, and the flag XNFGPG indicating finishing of concentration detection at the initial time is set to 1.

After the processing at step S410, the operation proceeds to step S411. Or, when the criterion at step S408 is established and the flag XNFGPG indicating finishing of concentration detection at the initial time is 1, the operation proceeds to step S411 by skipping step S409 and step S410. Or, when the criterion at step S409 is not established and the evaporative emission concentration is not stabilized, the operation proceeds to step S411 by skipping step S410. At step S411, a predetermined dull calculation (for example, dull calculation of 1/64) is carried out in order to calculate an evaporative emission concentration average value FGPGAV produced by averaging the evaporative emission concentration FGPG at the current time.

Thereafter, the routine is finished.

Further, after finishing the concentration detection at the initial time, the operation proceeds to step S405, since the criterion at step S404 is always established, and it is determined whether the purge rate PGR exceeds a predetermined value of β (%). When the criterion at step S405 is not established and the purge rate PGR is equal to or lower than the predetermined value β (%), this routine is finished. Meanwhile, when the criterion at step S405 is established, processings at, and subsequent to, step S406 are carried out. Step S406 is carried out for the following reason. When the purge rate PGR is small, that is, when the purge solenoid valve 20 is at the side of a low flow rate, the opening degree cannot be controlled accurately. Therefore, the evaporative emission concentration cannot be detected accurately. Therefore, although the evaporative emission concentration has to be detected at the initial time, at a time other than the initial time, the evaporative emission concentration is detected only under a condition where the concentration can accurately be detected and a value having an error as small as possible is provided.

Meanwhile, when the engine is in the state immediately after the ignition switch is turned ON at step S401, the evaporative emission concentration FGPG is set to 1.0 at step S412. Next, the evaporative emission concentration average value FGPGAV is set to 1.0 at step S413, and the flag XNFGPG indicating the initial time concentration detection is set to the initial value of 0 at step S414. Thereafter, the routine is finished. Here, the values of 1.0 in the evaporative emission concentration FGPG, and the evaporative emission concentration average value FGPGAV, signify that the evaporative emission concentration is 0 (fuel is not adsorbed at all). It is assumed initially that the adsorption is 0. The value of 0 in the initial time concentration detection flag XNFGPG signifies that the evaporative emission concentration has not been detected.

Fuel Injection Amount Control

An explanation will be given of a fuel injection amount control routine, with reference to FIG. 11. Incidentally, the fuel injection amount control routine is carried out in the CPU 41 about every 4 ms.

Figure 11:
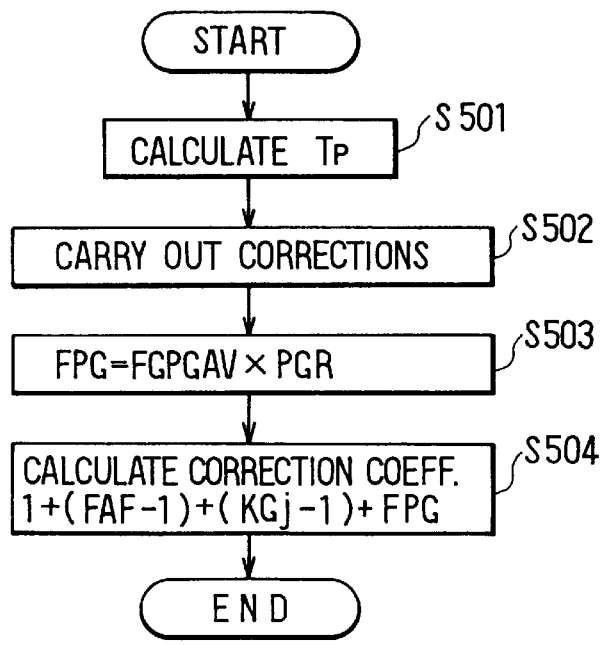
FIG. 11 is a flow diagram showing a processing procedure of the fuel injection amount control in the CPU of the ECU used in the air/fuel ratio control device of the present invention.

In FIG. 11, first, at step S501, a basic fuel injection amount TP is calculated by the engine rotational number NE and a load (for example, intake amount GN) based on a map stored in the ROM 42. Next, the routine proceeds to step S502, where various basic corrections (cooling water temperature correction, post starting correction, intake air temperature correction and the like) are carried out. Next, the operation proceeds to step S503, where the purge correction coefficient FPG is calculated by multiplying the evaporative emission concentration average value FGPGAV by the final purge rate PGR.

The purge correction coefficient FPG signifies a fuel amount replenished by carrying out the purging operation under a condition determined by the purge rate control processing, and represents a fuel amount which can be corrected to decrease from the basic fuel injection amount TP. Next, the routine proceeds to step S504, where a correction coefficient is calculated from the air/fuel ratio feedback correction coefficient FAF, the purge correction coefficient FPG, and an air/fuel ratio leaning value KGj by using an equation of {1+(FAF−1)+(KGj−1)+FPG}. The correction coefficient is reflected to the fuel injection amount TAU by being multiplied to the basic fuel injection amount TP. Thereafter, the routine is finished. Incidentally, the air/fuel ratio leaning value KGj is set to each operating region of the internal combustion engine.

Purge Solenoid Valve Control

An explanation will be given of a purge solenoid valve control routine, with reference to FIG. 12. Incidentally, the purge solenoid valve control routine is carried out in the CPU 41 by timewise interruption about every 100 ms.

Figure 12:
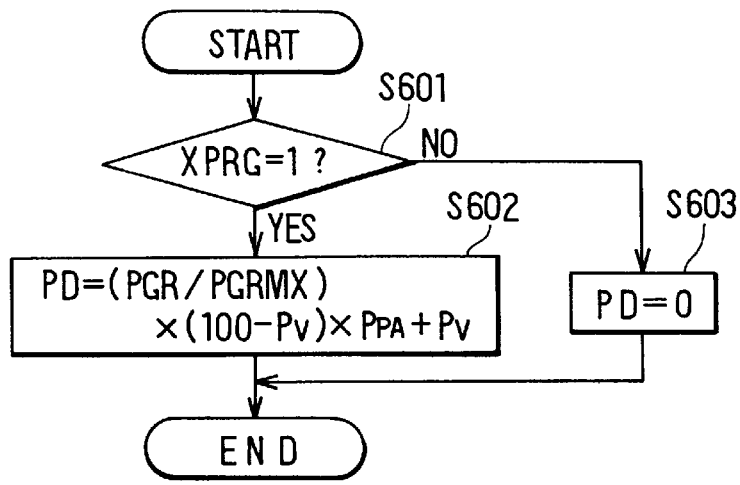
FIG. 12 is a flow diagram showing a processing procedure of purge solenoid valve control in the CPU used in the air/fuel ratio control device of the present invention.

In FIG. 12, first, at step 601, it is determined whether the purge executing flag XPRG is 1. When the criterion at step S601 is established, the operation proceeds to step S602, and the control duty (duty ratio) PD of the purge solenoid valve 20 is calculated by the following equation (1), with the routine being finished thereafter:

$$PD=(PGR/PGRMX)\infty(100-PV)[[M]yPPA+PV \qquad (1)$$

According to Equation (1), a period of driving the purge solenoid valve 20 is set to 100 ms. Further, notation PGR designates the final purge rate calculated at step S208 of FIG. 4, notation PGRMX designates the fully open purge rate at each operating state of the purge solenoid valve 20 (refer to FIG. 5 or FIG. 8), notation PV designates a voltage correction value in respect of a variation in battery voltage, and notation PPA designates an atmospheric pressure correction value with respect to a variation in the atmospheric pressure.

Meanwhile, when the criterion at step S601 is not established and the purging operation is not carried out, the routine proceeds to step S603 where the control duty PD of the purge solenoid valve 20 is set to 0. Thereafter, the routine is finished.

Modified Example of Purge Solenoid Valve Control

An explanation will be given of a modified example of the purge solenoid valve control routine based on FIG. 13, with reference also to FIG. 14. Incidentally, the modified example of the purge solenoid valve control routine is carried out in the CPU 41 by timewise interruption about every 100 ms. Further, FIG. 14 illustrates maps for calculating a predicted PM (predicted value of intake pressure) at each of the relative rotational angle AC (°CA) by the variable valve timing control mechanism 35, described in detail later, with the intake amount GN (g/rev) and the engine rotational number NE (rpm) as parameters.

Figure 13:
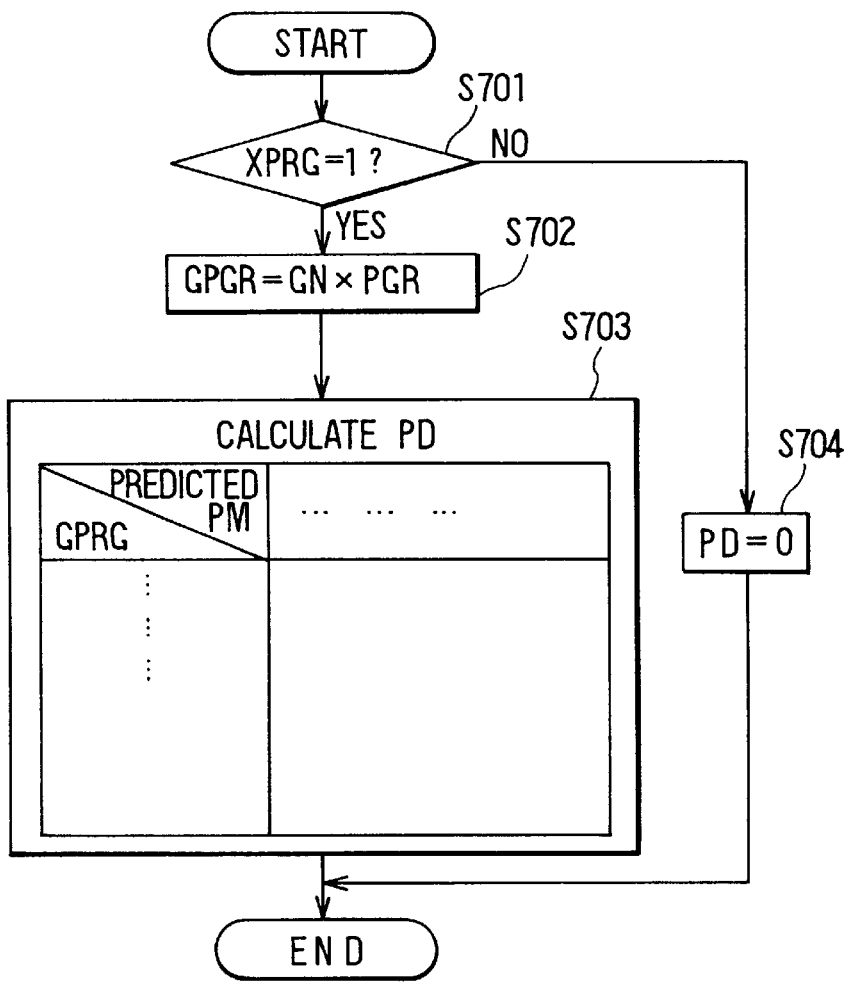
FIG. 13 is a flow diagram showing a processing procedure of a modified example of the purge solenoid valve control in the CPU used in the air/fuel control device of the present invention.
Figure 14:
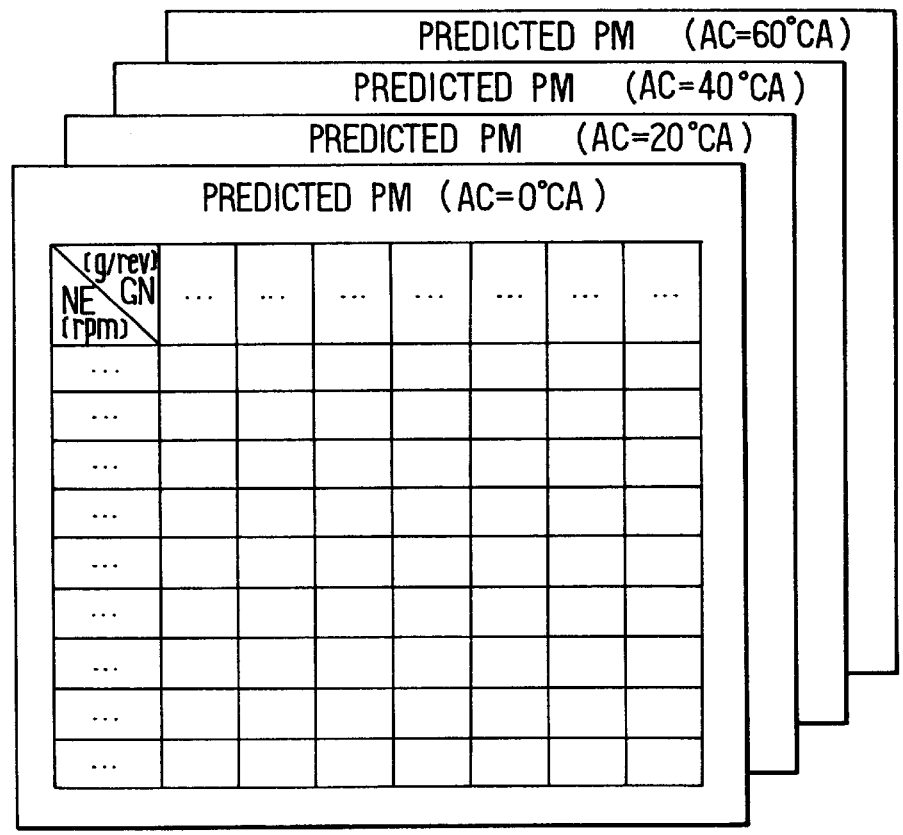
FIG. 14 illustrates maps for setting a predicted PM (predicted value of intake pressure) value in accordance with the relative rotational angle of the variable valve timing control mechanism, with the engine rotational number and the intake amount as parameters.

In FIG. 13, first, at step S701, it is determined whether the purge executing flag XPRG is 1. When the criterion at step S701 is established, the operation proceeds to step S702 where the purge flow rate GPGR is calculated by multiplying the intake amount GN by the final purge rate PGR. Next, the operation proceeds to step S703, where the control duty (duty ratio) PD of the purge solenoid valve 20 is calculated as follows. First, the predicted PM is calculated in correspondence with the relative rotational angle AC (°CA) by the variable valve timing control mechanism with the intake amount GN (g/rev) and the engine rotational number NE (rpm) as parameters, by using the maps of FIG. 14. Further, the control duty (duty ratio) PD of the purge solenoid valve 20 is calculated by a map with the predicted PM and the purge flow rate GPRG calculated at step S702 as parameters, with the routine finishing thereafter.

Meanwhile, when the criterion at step S701 is not established and the purging operation is not carried out, the operation proceeds to step S704, where the control duty PD of the purge solenoid valve 20 is set to 0, with the routine finishing thereafter.

Valve Timing Control

An explanation will be given of a valve timing control routine based on FIG. 15, with reference also to FIGS. 16 and 17. Incidentally, the valve timing control routine is carried out in the CPU 41 at a predetermined time interval. Further, FIG. 16 is a map for calculating a target relative rotational angle TAC from the engine rotational number NE (rpm) and the intake amount GN (g/rev), and FIG. 17 is a time chart showing transient states of the target relative rotational angle TAC (°CA) and the relative rotational angle AC (°CA).

Figure 15:
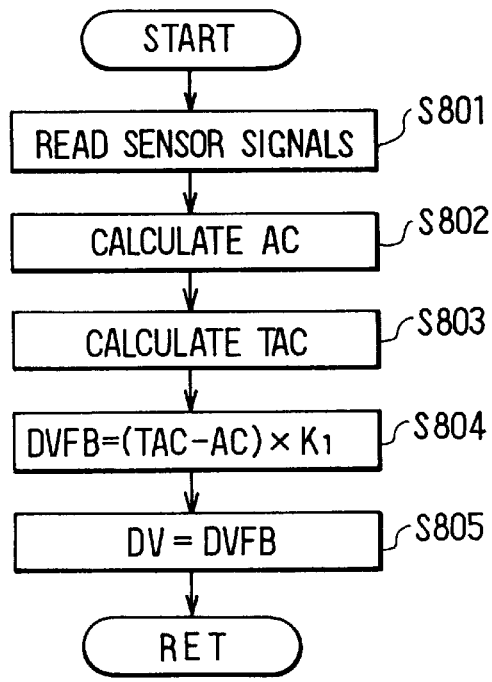
FIG. 15 is a flow diagram showing a processing procedure of valve timing control in the CPU used in the air/fuel ratio control device of the present invention.

In FIG. 15, first, at step S801, sensor signals of the crank angle signal θ1 of the crank angle sensor 32, the cam angle signal θ2 of the cam angle sensor 36, and the intake amount GN representing the operating state of the internal combustion engine 10, are read. Next, the routine proceeds to step S802, where the relative rotational angle AC (=θ1−θ2) that is a current phase difference of the cam shaft 34 with respect to the crank shaft 31, is calculated from the crank angle signal θ1 of the crank angle sensor 32 and the cam angle signal θ2 of the cam angle sensor 36, which are both read at step S801.

Figure 16:
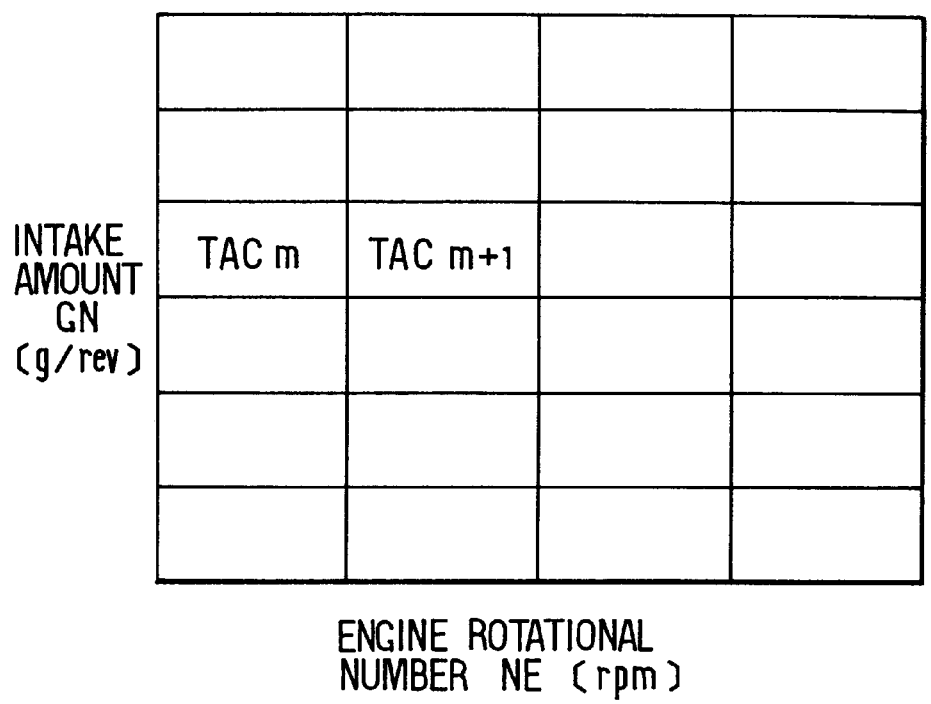
FIG. 16 illustrates a map for setting a target relative rotational angle in FIG. 15.
Figure 17:
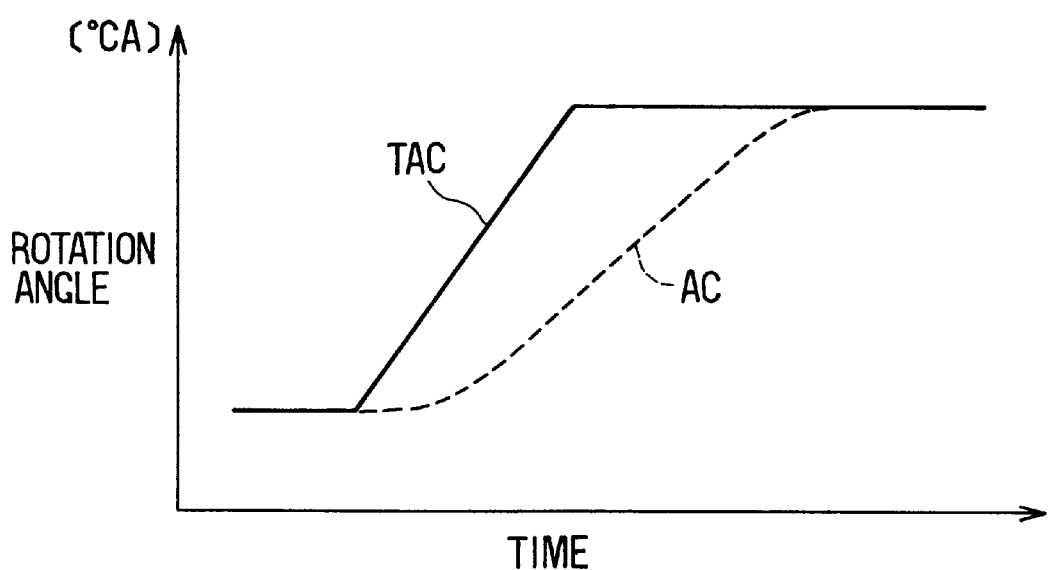
FIG. 17 is a timing diagram showing transient states of the target relative rotational angle and the relative rotational angle in the variable valve timing control mechanism used in the air/fuel ratio control device of the present invention.

Next, the routine proceeds to step S803 where the target relative rotational angle TAC, that is the current target phase difference, is calculated from the map shown by FIG. 16, based on the engine rotational number NE calculated from the crank angle signal θ1 and the intake amount GN, both of which are read at step S801. Next, the routine proceeds to step S804, where a feedback correction duty DVFB, which is a control rotational angle corrected by a feedback operation, is calculated by Equation (2) based on a deviation between the relative rotational angle AC calculated at step S802 and the target relative rotational angle TAC calculated at step S803, as shown in FIG. 17. In this equation, notation K1 designates a correction gain.

$$DVFB=(TAC-AC)*K1 \qquad (2)$$

Next, the operation proceeds to step S805, where the feedback correction duty DVFB calculated at step S804 constitutes a control duty (duty ratio) DV outputted to the spool valve 37 for driving the variable valve timing control mechanism 35.

As described above, the air/fuel ratio control device of the present invention comprises the air flow meter 4 as a physical amount detector for detecting the intake amount GN as a physical amount supplied to the internal combustion engine 1. The device also comprises the purge control means achieved by the ECU 40 for controlling the opening degree of the purge solenoid valve 20 when fuel vapor adsorbed to the canister 16 is discharged to the side of the surge tank 15 on the intake side of the internal combustion engine 1, based on the intake amount GN detected by the air flow meter 4. The device of the present invention also comprises the variable valve timing control mechanism 35 installed at the drive force transmitting system for transmitting drive force from the crank shaft 31 as the drive shaft of the internal combustion engine 1 to the cam shaft 34 as a driven shaft for opening and closing the intake valve 33. The device of the present invention further comprises the purge correction means achieved by the ECU 40 for correcting the final purge rate PGR as the opening degree of the purge solenoid valve 20 by the purge control means, such that a desired flow rate by purge can be obtained, regardless of the relative rotational angle AC, as the amount of operating the variable valve timing control mechanism 35.

That is, the pumping loss of the internal combustion engine 1 is varied by a change in the relative rotational angle AC by the variable valve timing control mechanism 35, and a change in the intake pressure in the intake passage 2 is caused by influence of inertia supercharging by which the purge flow rate is changed. In this case, the fully open purge rate PGRMX of the purge solenoid valve 20 is set to the respective relative rotational angle AC by the variable valve timing control mechanism 35. Accordingly, the final purge rate PGR of the purge solenoid valve 20 is set by considering the set fully open purge rate PGRMX by the purge correcting means. Accordingly, the desired purge flow rate can be controlled regardless of the relative rotational angle AC by the variable valve timing control mechanism 35.

Further, the air/fuel ratio control device of the present invention comprises the air flow meter 4 as physical amount detecting means for detecting the intake amount GN as a physical amount supplied to the internal combustion engine 1. The device of the present invention also comprises the purge control means achieved by the ECU 40 for controlling the opening degree of the purge solenoid valve 20 when fuel vapor adsorbed to the canister 16 is discharged to the side of the surge tank 15 on the intake side of the internal combustion engine 1. The opening degree is based on the intake amount GN detected by the air flow meter 4, the variable valve timing control mechanism 35 installed at the drive force transmitting system for transmitting drive force from the crank shaft 31 as the drive shaft of the internal combustion engine 1 to the cam shaft 34 as a driven shaft for opening and closing the intake valve 33, and the purge correcting means achieved by ECU 40 for correcting the opening degree of the purge solenoid valve 20 by the purge control means, or a load used in calculating the opening degree in accordance with the relative rotational angle AC as the amount of operating the variable valve timing control mechanism 35.

That is, the fully open purge rate PGRMX of the purge solenoid valve 20, or the load used in calculating the fully open purge rate PGRMX, is corrected by the ECU 40 achieving the purge correcting means in accordance with the relative rotational angle AC by the variable valve timing control mechanism 35. Therefore, the desired purge flow rate can be controlled regardless of the relative rotational angle AC, by the variable valve timing control mechanism 35.

Further, the air/fuel ratio control device of the present invention comprises the air flow meter 4 as physical amount detecting means for detecting the intake amount GN as a physical amount supplied to the internal combustion engine 1, the purge control means achieved by ECU 40 for controlling the opening degree of the purge solenoid valve 20 when fuel vapor adsorbed to the canister 16 is discharged to the side of the surge tank 15 on the intake side of the internal combustion engine 1 based on the intake amount GN detected by the air flow meter 4, the variable valve timing control mechanism 35 installed at the drive force transmitting system for transmitting drive force from the crank shaft 31 as the drive shaft of the internal combustion engine 1 to the cam shaft 34 as a driven shaft for opening and closing the intake valve 33, fuel concentration detecting means achieved by ECU 40 for directly or indirectly detecting an evaporative emission concentration in purging operation by the purge control means, fuel amount correcting means achieved by ECU 40 for correcting the fuel injection amount TAU supplied to the internal combustion engine 1 based on the opening degree of the purge solenoid valve 20 by the purge control means and the evaporative emission concentration detected by the fuel concentration detecting means, and the purge correcting means achieved by the ECU 40 for correcting the opening degree of the purge solenoid valve 20 by the purge control means or a load used in calculating the opening degree in accordance with the relative rotational angle AC as the amount of operating the variable valve timing control mechanism 35.

That is, the evaporative emission concentration in purging operation is directly or indirectly detected by the ECU 40 achieving the fuel concentration detecting means, and the fuel injection amount TAU is corrected based on the opening degree of the purge solenoid valve 20 and the evaporative emission concentration by the ECU 40 achieving the fuel amount correcting means. Here, the fully open purge rate PGRMX of the purge solenoid valve 20, or the load used in calculating the fully open purge rate PGRMX is corrected by the ECU 40 achieving the purge correcting means in accordance with the relative rotational angle AC by the variable valve timing control mechanism 35. Therefore, the desired purge flow rate can be controlled regardless of the relative rotational angle AC by the variable valve timing control mechanism 35.

Further, according to the air/fuel ratio control device of the present invention, the purge correcting means achieved by the ECU 40 sets the opening degree of the purge solenoid valve 20 by the purge control means achieved by ECU 40 in accordance with the relative rotational angle AC, as the amount of operating the variable valve timing control mechanism 35 with the intake amount GN detected by the air flow meter 4 as the physical amount detecting means and the engine rotational number NE of the internal combustion engine 1 as parameters. That is, the fully open purge rate PGRMX of the purge solenoid valve 20 is set in accordance with the relative rotational angle AC by the variable valve timing control mechanism 35 with the intake amount GN by the air flow meter 4 and the engine rotational number NE as parameters in the ECU 40 achieving the purge collecting means. Accordingly, the desired purge flow rate can be controlled regardless of the relative rotational angle AC by the variable valve timing control mechanism 35.

Further, according to the air/fuel ratio control device of the present invention, the purge correcting means achieved by the ECU 40 corrects the intake amount GN detected by the air flow meter 4 as the physical amount detecting means in accordance with the relative rotational angle AC as the amount of operating the variable valve timing control mechanism 35, and sets the opening degree of the purge solenoid valve 20 by the purge control means achieved by ECU 40 with the corrected value and the engine rotational number NE of the internal combustion engine 1 as parameters.

That is, the fully open purge rate PGRMX of the purge solenoid valve 20 is set with the intake amount GN by the air flow meter 4 that is corrected in accordance with the relative rotational angle AC by the variable valve timing control mechanism 35 and the engine rotational number NE as parameters in the ECU 40 constituting the purge correcting means. Therefore, the desired purge flow rate can be controlled regardless of the relative rotational angle AC by the variable valve timing control mechanism 35.

Further, according to the air/fuel ratio control device of the present invention, the purge correcting means achieved by the ECU 40 corrects the opening degree of the purge solenoid valve 20 such that the larger the retard angle amount of the intake valve 33 becomes by the variable valve timing control mechanism 35, the smaller the opening degree of the purge solenoid valve 20 becomes. Accordingly, the variable valve timing control mechanism 35 is connected to the side of the intake valve 33, and the larger the retard angle amount of the intake valve 33 becomes, the larger the pumping loss of the internal combustion engine 1, the inertia supercharging is operated, the intake pressure is lowered and, accordingly, the opening degree of the purge solenoid valve 20 is reduced. Thereby, the desired purge flow rate can be controlled regardless of the relative rotational angle AC by the variable valve timing control mechanism 35.

Further, according to the present invention, the purge correcting means achieved by ECU 40 corrects the opening degree of the solenoid valve 20, such that the larger the advance angle amount of the exhaust valve 38 becomes by the variable valve timing control mechanism 35 becomes, the smaller the opening of the purge solenoid valve becomes. Accordingly, the variable valve timing control mechanism 35 is connected to the side of the exhaust valve 38, the larger the advance angle amount of the exhaust valve 38 becomes, the larger the pumping loss of the internal combustion engine 1 becomes. Accordingly, the opening degree of the purge solenoid valve 20 is reduced. Thereby, the desired purge flow rate can be controlled regardless of the relative rotational angle AC by the variable valve timing control mechanism 35.

What is claimed is:

1. An air/fuel ratio control device for an internal combustion engine comprising: physical amount detecting means for detecting a physical amount related to an intake amount supplied to the internal combustion engine;

purge controlling means for controlling an opening degree of a purge valve when fuel vapor adsorbed to a canister is discharged to an intake side of the internal combustion engine based on the physical amount detected by the physical amount detecting means;

a variable valve timing control mechanism installed in a drive force transmission mechanism for transmitting a drive force from a drive shaft of the internal combustion engine to a driven shaft for opening and closing at least one of an intake valve and an exhaust valve, and that is capable of rotating either one of the drive shaft and the driven shaft through a predetermined angle range; and purge correcting means for correcting the opening degree of the purge valve by the purge controlling means to provide a desired purge flow rate independently from variable valve timing control mechanism operating parameters.

2. The air/fuel ratio control device for an internal combustion engine according to claim 1, wherein the purge correcting means sets the opening degree of the purge valve by the purge controlling means in accordance with the operation of the variable valve timing control mechanism, with the physical amount detected by the physical amount detecting means and an engine rotation value as parameters.

3. The air/fuel ratio control device for an internal combustion engine according to claim 1, wherein the purge correcting means corrects the physical amount detected by the physical amount detecting means in accordance with the operation of the variable valve timing control mechanism, and sets the opening degree of the purge valve by the purge controlling means with a correction value of the physical amount and an engine rotation value of the internal combustion engine as parameters.

4. The air/fuel ratio control device for an internal combustion engine according to claim 1, wherein the purge correcting means corrects the opening degree of the purge valve by the variable valve timing control mechanism such that, as a retard angle amount of the intake valve increases, the opening degree of the purge valve decreases.

5. The air/fuel ratio control device for an internal combustion engine according to claim 1, wherein the purge correcting means corrects the opening degree of the purge valve by the variable valve timing control mechanism, such that, as an advance angle amount of the exhaust valve increases, the opening degree of the purge valve decreases.

6. An air/fuel ratio control device for an internal combustion engine comprising:

physical amount detecting means for detecting a physical amount related to an intake amount supplied to the internal combustion engine;

purge controlling means for controlling an opening degree of a purge valve when fuel vapor adsorbed to a canister is discharged to an intake side of the internal combustion engine based on the physical amount detected by the physical amount detecting means;

a variable valve timing control mechanism installed in a drive force transmission mechanism for transmitting a drive force from a drive shaft of the internal combustion engine to a driven shaft for opening and closing at least one of an intake valve and an exhaust valve, and that is capable of rotating either one of the drive shaft and the driven shaft through a predetermined angle range; and purge correcting means for correcting either of the opening degree of the purge valve by the purge controlling means and a load used in calculating the opening degree independently from variable valve timing control mechanism oerating parameters.

7. The air/fuel ratio control device for an internal combustion engine according to claim 1, wherein the purge correcting means sets the opening degree of the purge valve by the purge controlling means in accordance with the operation of the variable valve timing control mechanism, with the physical amount detected by the physical amount detecting means and an engine rotation value as parameters.

8. The air/fuel ratio control device for an internal combustion engine according to claim 1, wherein the purge correcting means corrects the physical amount detected by the physical amount detecting means in accordance with the operation of the variable valve timing control mechanism, and sets the opening degree of the purge valve by the purge controlling means with a correction value of the physical amount and an engine rotation value of the internal combustion engine as parameters.

9. The air/fuel ratio control device for an internal combustion engine according to claim 1, wherein the purge correcting means corrects the opening degree of the purge valve by the variable valve timing control mechanism such that, as a retard angle amount of the intake valve increases, the opening degree of the purge valve decreases.

10. The air/fuel ratio control device for an internal combustion engine according to claim 1, wherein the purge correcting means corrects the opening degree of the purge valve by the variable valve timing control mechanism, such that, as an advance angle amount of the exhaust valve increases, the opening degree of the purge valve decreases.

11. An air/fuel ratio control device for an internal combustion engine comprising:

purge correcting means for correcting either of the opening degree of the purge valve by the purge controlling means and a load used in calculating the opening degree independently from variable valve timing control mechanism operating parameters.

12. The air/fuel ratio control device for an internal combustion engine according to claim 1, wherein the purge correcting means sets the opening degree of the purge valve by the purge controlling means in accordance with the operation the variable valve timing control mechanism, with the physical amount detected by the physical amount detecting means and an engine rotation value being used as parameters.

13. The air/fuel ratio control device for an internal combustion engine according to claim 1, wherein the purge correcting means corrects the physical amount detected by the physical amount detecting means in accordance with the operation of the variable valve timing control mechanism, and sets the opening degree of the purge valve by the purge controlling means with a correction value of the physical amount and an engine rotation value of the internal combustion engine as parameters.

14. The air/fuel ratio control device for an internal combustion engine according to claim 1, wherein the purge correcting means corrects the opening degree of the purge valve by the variable valve timing control mechanism such that, as a retard angle amount of the intake valve increases, the opening degree of the purge valve decreases.

15. The air/fuel ratio control device for an internal combustion engine according to claim 1, wherein the purge correcting means corrects the opening degree of the purge valve by the variable valve timing control mechanism, such that, as an advance angle amount of the exhaust valve p increases, the opening degree of the purge valve decreases.

16. An air/fuel ratio control device for an internal combustion engine comprising:

a detector that detects a physical amount related to a intake amount supplied to the internal combustion engine;

a controller that is programmed to control an opening degree of a purge valve when fuel vapor adsorbed to a canister is discharged to an intake side of the internal combustion engine based on the physical amount detected by the detector;

a variable valve timing control mechanism installed in drive force transmission mechanism for transmitting a drive force from a drive shaft of the internal combustion engine to a driven shaft for the opening and closing at least one of an intake valve and an exhaust valve, and that is capable of rotating either one of the drive shaft and the driven shaft through a predetermined angle range; and the controller also being programmed to correct the opening degree of the purge valve to provide a desired purge flow rate independently from variable valve timing control mechanism operating parameters.

17. An air/fuel ratio control device for an internal combustion engine comprising:

a detection that detects a physical amount related to an intake amount supplied to the internal combustion engine;

a controller that is programmed to control an opening degree of a purge valve when fuel vapor adsorbed to a canister is discharged to an intake side of the internal combustion engine based on the physical amount detected by the detector;

a variable valve timing control mechanism installed in a drive force transmission mechanism for transmitting a drive force from a drive shaft of the internal combustion engine to a driven shaft for opening and closing at least one of an intake valve and an exhaust valve, and that is capable of rotating either one of the drive shaft and the driven shaft through a predetermined angle range; and the controller also being programmed to correct either of the opening degree of the purge valve and a load used in calculating the opening degree independently from variable valve timing control mechanism operating parameters.

18. An air/fuel ratio control device for an internal combustion engine comprising:

a detector for detecting a physical amount related to an intake amount supplied to the internal combustion engine;

a controller that is programmed to control an opening degree of a purge valve when fuel vapor adsorbed to a canister is discharged to an intake side of the internal combustion engine based on the physical amount detected by the detector;

a variable valve timing control mechanism installed in a drive force transmission mechanism for transmitting a drive force from a drive shaft of the internal combustion engine to a driven shaft for opening and closing at least one of an intake valve and an exhaust valve, and that is capable of rotating either one of the drive shaft and the driven shaft relative to other thereof in a predetermined angle range;

a fuel concentration detector that detects a purged fuel concentration; and the controller also being programmed to control a fuel injection amount supplied to the internal combustion engine based on the opening degree of the purge valve and the fuel concentration detected by the fuel concentration detector, and to detect either of the opening degree of the purge and a load used in calculating the opening degree independently form variable valve timing control mechanism operating parameters.

* * * * *